J. E. STICK AND G. M. HIATT.
HOLDER FOR AXLE SPINDLES.
APPLICATION FILED JULY 25, 1919.

1,332,931.

Patented Mar. 9, 1920.

Inventors
John E. Stick
George M. Hiatt
By Philip A. H. Terrell
their Attorney

UNITED STATES PATENT OFFICE.

JOHN EDGAR STICK AND GEORGE MILTON HIATT, OF ALBANY, INDIANA.

HOLDER FOR AXLE-SPINDLES.

1,332,931.　　　　Specification of Letters Patent.　　Patented Mar. 9, 1920.

Application filed July 25, 1919.　Serial No. 313,336.

*To all whom it may concern:*

Be it known that we, JOHN EDGAR STICK and GEORGE MILTON HIATT, citizens of the United States, residing at Albany, in the county of Delaware and State of Indiana, have invented certain new and useful Improvements in Holders for Axle-Spindles, of which the following is a specification, reference being had therein to the accompanying drawing.

The invention relates to holders for spindles of automobile axles and has for its object to provide a holder, wherein the spindle of an automobile axle and the wheel on the same will be held against pivoting while working on the wheel or tires, especially when the axle has been jacked up and the wheel out of contact with the ground. When placing a tire on the wheel cosiderable pressure at times is necessary to be applied near the periphery of the wheel, which pressure, for instance forcing on a tire, will cause the spindle sleeve to rotate thereby making it extremely difficult and tedious to replace the tire.

A further object is to provide a spindle holder comprising a member so constructed as to engage the axle, the spindle arm and the connecting rod and hold the same in spaced relation to each other, that is preferably when the wheels are in normal position at right angles to the axle.

With the above and other objects in view the invention resides in the combination and arrangement of parts as hereinafter set forth, shown in the drawings and claimed, it being understood that changes in the precise embodiment of the invention may be made within the scope of what is claimed without departing from the spirit of the invention.

In the drawings:—

Figure 1:
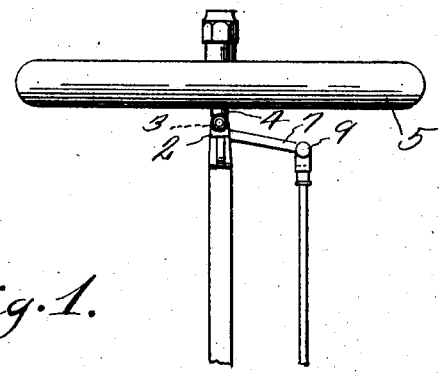
Figure 1 is a plan view of the forward axle and wheels of a motor driven vehicle showing the spindle holder applied thereto.
Figure 2:
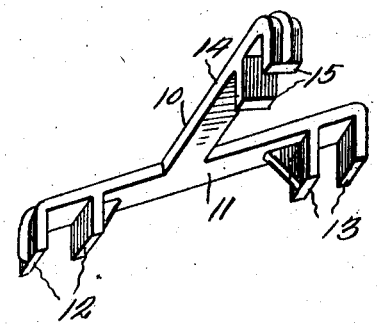
Fig. 2 is a perspective view of the holder.
Figure 3:
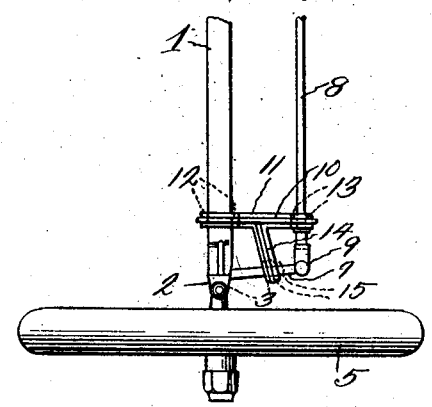
Fig. 3 is a perspective view of one end of the axle showing the spindle being held by the holder, said holder being designed for the right hand side of the axle.

Referring to the drawings, the numeral 1 designates the front axle of an automobile and 2 the arms carried at the ends thereof between which the spindle sleeves 3 are pivoted, said spindle sleeves being provided with conventional form of spindles 4 on which wheels 5 are rotatably mounted. The inner sides of the spindle sleeves 3 are provided with lugs 6 and secured to and extending rearwardly from the same are spindle arms 7. Spindle arms 7 are usually inclined inwardly and are connected together by a connecting rod 8 which is pivotally secured to the spindle arms as at 9, thereby providing means whereby the wheels will be moved in unison.

While replacing a tire or working on a wheel the axle is generally jacked up so that the wheel is clear of the ground, under which conditions it will be seen that any pressure upon the wheel will cause the same to pivot in a horizontal plane. To overcome this pivotal action and to hold the wheel rigid while replacing a tire or working on the wheel, a holder 10 is provided, said holder comprising a body member 11, the ends of which being provided with downwardly extending lugs 12 and 13. Between lugs 12 axle 1 is disposed and between lugs 13, the connecting rod 8 is disposed thereby preventing the connecting rod from moving closer to or farther away from the axle when pressure is applied near the edge of the wheel. Body member 11 is provided with an arm 14, the end of which has downwardly extending lugs 15 and between the lugs 15 the spindle arm 7 is adapted to be received, thereby preventing the movement of the spindle arm.

From the above it will be seen that the axle, connecting rod and spindle arm will be held against pivotal action, therefore the wheel will be prevented from movement when force is applied to the same on either side of the vertical center line thereof. It will also be seen that the wheel at the opposite end of the axle will be prevented from pivotal movement.

Arm 14 is angled according to the type of automobile, however it will be noted that by means of this angle arm and the angled position of the recess between the downwardly extending lug 15 that a twisting action is applied to the holder as a whole, which will cause lugs 12 and 13 to be twisted thereby binding upon the axle and the connecting rod 8.

The invention having been set forth what is claimed as new and useful is:—

1. A spindle holder for axles comprising a body member, said body member having a recess for the reception of the axle, a recess for the reception of the spindle arm and a recess for the reception of the connecting rod whereby said axle, spindle arm and connecting rod will be held and braced in relation to each other.

2. A spindle holder for axles comprising a body member having at its ends spaced lugs, the recess between the spaced lugs at one end thereof being adapted to receive the axle, the recess at the other end of said body member being adapted to receive the spindle arm connecting rod, an integral angularly extending arm carried by said body member, spaced lugs at the ends of said angularly extending arm, the recess between said last named spaced lugs being adapted to receive therebetween the rearwardly and inwardly extending spindle arm, said recesses at the ends of the body member and at the ends of the angularly extending arm preventing the pivotal movement of the axle, spindle arm and connecting rod.

In testimony whereof we hereunto affix our signatures.

JOHN EDGAR STICK.
GEORGE MILTON HIATT.